United States Patent [19]

Batchelor

[11] Patent Number: 5,278,984
[45] Date of Patent: Jan. 11, 1994

[54] METHOD FOR MANAGING REQUESTS BY SPECIFYING TIME INTERVALS FOR TRANSMITTING A MINIMUM NUMBER OF MESSAGES FOR SPECIFIC DESTINATIONS AND PRIORITY LEVELS

[75] Inventor: Richard E. Batchelor, Wellesley, Mass.

[73] Assignee: Bull HN Information Systems Inc., Billerica, Mass.

[21] Appl. No.: 629,873

[22] Filed: Dec. 19, 1990

[51] Int. Cl.⁵ .................. G06F 7/06; G06F 13/18
[52] U.S. Cl. ............................. 395/650; 395/200; 364/281.3; 364/281.8; 364/271.9; 364/DIG. 1
[58] Field of Search ............... 395/200, 600, 650, 550; 364/514, 401

[56] References Cited

U.S. PATENT DOCUMENTS 4,543,630  9/1985  Neches ............................. 395/200
4,713,780  12/1987  Schultz et al. ..................... 364/514
4,989,133  1/1991  May .................................. 395/550

OTHER PUBLICATIONS

An Introduction to Operating Ssytems H. M. Deitel 1983 pp. 127, 139-143.

Primary Examiner—Thomas C. Lee
Assistant Examiner—Jennifer M. Orzech
Attorney, Agent, or Firm—Gary D. Clapp; Lewis P. Elbinger; John S. Solakian

[57] ABSTRACT

A queue manager for controlling the execution of requests for the transport of messages from users to destinations. Each request includes a message and an identification of a destination. The queue manager includes a queue for storing pending requests and a dispatcher task for creating a worker task to execute each request and provides a method for adapting the execution of requests to constraints and characteristics of destinations and communications links.

5 Claims, 2 Drawing Sheets

METHOD FOR MANAGING REQUESTS BY SPECIFYING TIME INTERVALS FOR TRANSMITTING A MINIMUM NUMBER OF MESSAGES FOR SPECIFIC DESTINATIONS AND PRIORITY LEVELS

BACKGROUND OF THE INVENTION

1. Field of Use

The present invention relates to electronic mail systems and, in particular, to a method for improving the adaptability of a mail queue manager to the constraints and characteristics of the recipients of a mail system.

2. Prior Art

Electronic mail systems are well known in the prior art and, as is well known, are computer based systems used to delivery mail, such as messages and data files, between computer systems through various communications links. A recurring problem with electronic mail systems of the prior art, however, is in achieving an optimum level of performance given the diverse and very variable constraints imposed on system operation due to the constraints and characteristics of the recipient systems and the communications links between the systems. For example, even though many systems of the prior art use such techniques as queueing, or time delayed delivery of message requests, the prioritization of messages to determine sequence of execution and access to resources, and programmed retries of failed attempts to deliver messages, none have been sufficiently adaptable to the characteristics of the system resources to provide optimum performance.

In addition, most mail systems of the prior art require complex procedures to initiate and operate the systems and require equally complex procedures to recover the system in the event of system failure, often resulting in lost messages.

The present invention addresses these and other problems of the systems of the prior art.

OBJECTS OF THE INVENTION

It is therefore an object of the present invention to provide an electronic mail system having improved adaptability to the constraints and characteristics of systems resources, such as the communications links and resources of the recipients.

It is a further object of the present invention to provide an electronic mail system having improved reliability and improved and simplified recovery from system failure, with a substantially decreased probability that messages will be lost on system failure.

SUMMARY OF THE INVENTION

The present invention provides a queue manager for use in an electronic mail system for controlling the execution of requests for the transport of messages from users to destinations. Each request includes a message and an identification of a destination. The queue manager includes a queue for storing pending requests, a dispatcher task responsive to each request for creating a corresponding worker task to execute the request and for associating the worker task with a corresponding bound unit for transporting the messages to the destination through communications links.

The queue manager provides a method for adapting the operation of the queue manager, that is, the execution of requests, to the constraints and characteristics of the destinations and the communications links.

According to the present invention, each request includes a parameter indicating a priority level of the request, and the queue manager stores a table containing an entry for each destination.

Each destination table entry includes an identification of a bound unit serving that destination, and a set of descriptors describing time windows during which the destination may receive messages. Each window corresponds to a priority level, and each window descriptor contains parameters identifying the priority level of the window, a time during which the window is open, and an economic quantity.

The dispatcher task scans the destination table to determine which windows are currently open, and the queue to identify pending requests for the currently open windows and whether the number of requests for an open window equals or exceeds the economic quantity for the window. If the number of requests for a window exceeds the economic quantity for the window, the dispatcher task executes the requests corresponding to the open window.

In further aspects of the invention, the group of requests corresponding to a currently open window and satisfying the economic quantity for the window are executed as a batch. In addition, all higher level priority requests pending for a window are executed during the execution of a batch of lower priority requests for the window and queued requests of a higher priority level for a destination will be counted towards satisfying the economic quantity of a lower level priority window of that destination.

In a further embodiment of the queue manager, each request includes parameters specifying attempts to retry execution of the request when an attempt to execute the request fails. The bound units are responsive to the results of each attempt to transport the message of a request for providing result messages to the dispatcher task indicating the results of each attempt to execute a corresponding request, and the dispatcher task is responsive to the result messages to reschedule execution of a request according to the retry parameters when an attempt to execute the request fails.

The retry parameters may include at least one parameter specifying a time interval to elapse before the request is to be retried, and a parameter specifying whether the request is to be retried a limited number of times or is to be retried until successfully executed.

The dispatcher task is responsive to a failed attempt to execute a request to a destination to suspend execution of all requests to the destination for a specified time. The dispatcher task will then attempt to execute a request to a suspended destination after the elapse of the specified suspension interval. The dispatcher task will resume execution of all other requests to the destination when the attempt to execute a request to the destination succeeds, or will continue suspension of execution of requests to the destination for a further specified suspension interval when the attempt to execute a request to the destination fails.

BRIEF DESCRIPTION OF THE DRAWINGS

The foregoing and other objects, features and advantages of the present invention will be apparent from the following description of the invention and embodiments thereof, as illustrated in the accompanying figures, wherein.

DESCRIPTION OF A PREFERRED EMBODIMENT

A. General Structure and Operation of the Queue Manager (FIG. 1)

Figure 1:
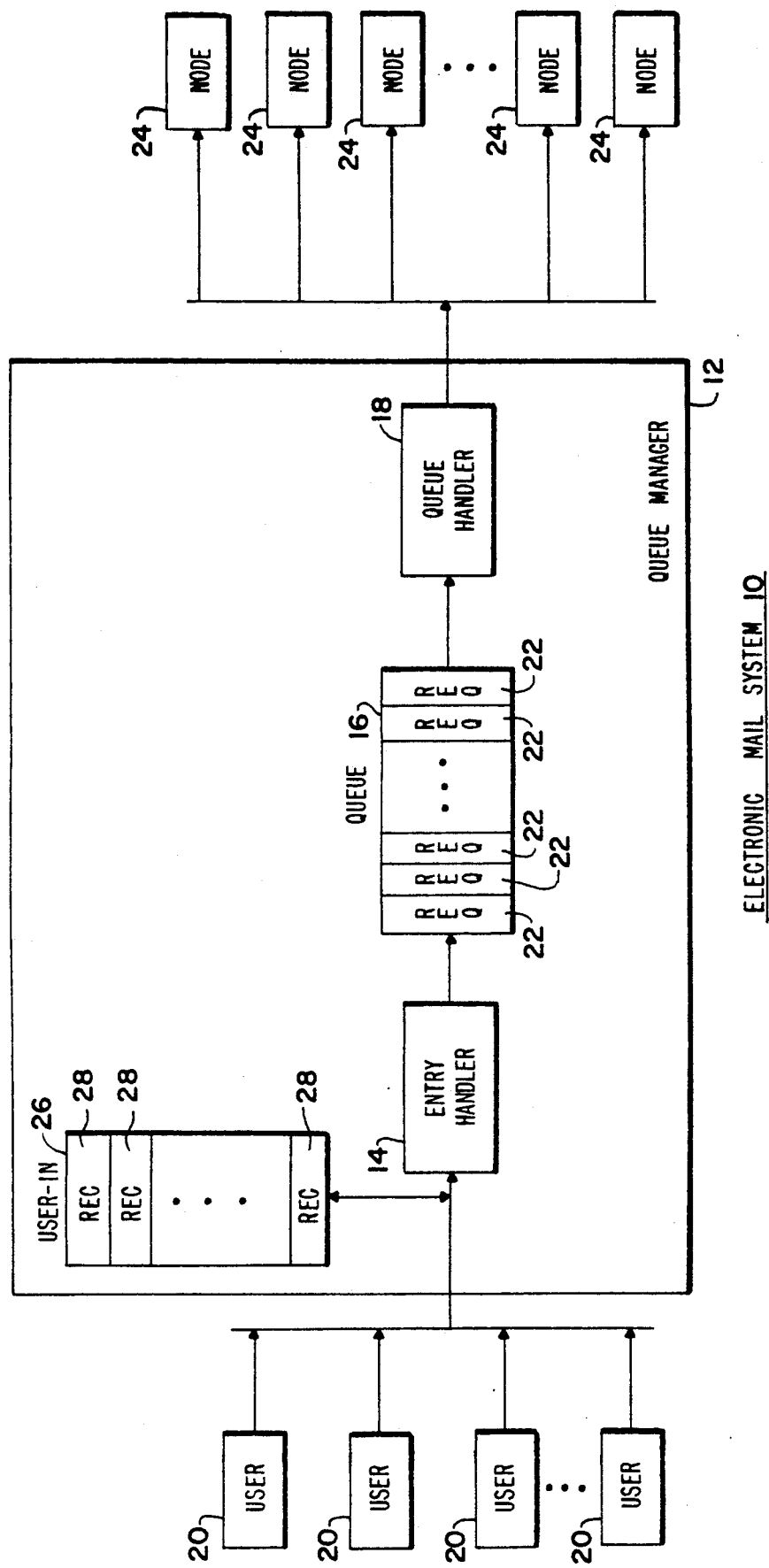
FIG. 1 is a block diagram of an exemplary system incorporating the present invention.

Referring to FIG. 1, therein is shown a diagrammatic representation of an Electronic Mail System 10 employing a Queue Manager 12 according to the present invention. Electronic Mail System 10 and Queue Manager 12 may be implemented, for example, in any computer or communications system or in a communications server, and Queue Manager 12 may operate in conjunction with any electronic message system, for example, an electronic mail system or other wide or local area network. The construction and operation of such computer and server systems and such electronic mail systems is widely and well know to those of ordinary skill in the art the the following description of the invention will focus on Queue Manager 12.

As indicated, the primary elements of Queue Manager 12 are an Entry Handler 14, a Queue 16 and a Queue Handler 18. Users 20 enter requests for messages to be transmitted through EMS 10 through Entry Handler 14, which in turn writes the requests, which contain the messages, into Queue 16 as Requests (REQs) 22. The REQs 22 are subsequently read from Queue 16 by Queue Handler 18 and the messages transmitted to the appropriate destinations, or recipients, referred to as Nodes 24.

User 20 inputs to Queue Manager 12, such as electronic mail messages and commands directing operations of Queue Manager 12, are provided in the form of User-In Files (User-In) 26, each of which is comprised of one or more Records (RECs) 28. Each REC 28 in turn is a command line which includes a keyword, which may be followed by parameters. The present library of possible commands are described below.

User-In Files 26s may be provided, for example, from a user terminal keyboard input or from a file stored on a disk or tape or in a system memory or may be generated by a user interface program which generates the appropriate sequences of RECs 28 in response to user menu selections, and so forth as is well understood in the art.

As will be discussed in further detail in the following, Queue Manager 12 incorporates a library of subroutines which are used to control the various operations of Queue Manager 12, for example, in response to the individual tasks being executed by Queue Manager 12 itself or in response to the commands of RECs 28. Certain of these subroutines, described further below, such as those for putting a request, that is, a REQ 22, in Queue 16 or deleting a REQ 22 from Queue 16, may be linked with and invoked from any program, such as a word processing program or an electronic mail program, for the purpose of permitting the programs to initiate electronic mail messages.

As will also be described further in the following, Queue Manager 12 may also be provided with input files describing, for example, constraints or characteristics of the various Nodes 24, or destinations which may receive REQs 22 from Queue Manager 12, such as the times during which the Nodes 24 are available to receive REQs 22, the maximum and economic number of messages that may be sent to any given Node 24, and so forth.

As described in further detail in the following, Queue Handler 18 is embodied as a group of "tasks" which will take each REQ 22 in Queue 18 and schedule and execute those requests according to their priorities and the order in which they were received from the Users 20 and may execute more than one queued REQ 22 at any given time. Queue Manager 12 will also take into consideration any constraints on the delivery of REQs 22 to certain Nodes 24 in scheduling the delivery of REQs 22 to those destinations if such information is provided.

In general, and unless Queue Manager 12 receives a response to an attempted execution of a REQ 22 that a REQ 22 is impossible to execute, Queue Handler 18 will re-attempt each REQ 22 at varying time intervals, retaining the REQ 22 in Queue 18, until the request is successfully executed or until a specified limit on the number of attempts is reached.

B. Constraints and Control Commands, Records 28, and the Programmatic Interface Before continuing to a more detailed description of Queue Manager 12, a discussion of the possible constraints on Queue Manager 12 operation and the commands which may appear in the Records 28 of a User-In 26 will illustrate certain of the operations of Queue Manager 12. It should be noted that the following descriptions of data structures, commands, instructions and programs use standard "C" programming conventions which will be well understood by those of ordinary skill in the art.

B.1 Constraints

Certain constraints may be imposed on Queue Manager 12 operations to insure that the Queue Manager 12 operates in an optimum manner for a particular system and combination of users and destinations. As discussed above, these constraints may be imposed through RECs 28, while others, such as those pertaining to the characteristics of individual destinations, that is, Nodes 24, may be entered by other means, such as separate dedicated files, while others may result from attempts by Queue Manager 12 to execute requests.

The constraints which may be imposed on Queue Manager 12 through the RECs 28 include:

A limit on the maximum number of tasks, or requests, that may be active at any time;

A limit on the maximum number of tasks scheduled for a particular destination, with a separate limitation being given for each destination, or Node 22;

A limit on the maximum number of tasks that may be scheduled for a particular user at any time; and, Constraints on the number of tries that may be made to complete a given task, that is, a given REQ 22, and the times which must elapse between retry attempts.

Further considering the limitations on time interval and number of attempts to accomplish a given REQ 22, it has been previously stated that if an attempt to complete a REQ 22 fails, that REQ 22 will be retained in Queue 16 and retried at a later time. A given REQ 22 will not, however, be a candidate for another attempt until "retry_1_time" has passed. The REQ 22 will then again be attempted and may be attempted up to "retry_limit" times and, if it fails to be completed within "retry_limit" attempts, it will not be attempted again until "retry_2_time" has passed, at which time it will again be attempted up to "retry_limit" times.

If the attempts to complete the REQ 22 again fail, Queue Manager 12 may simply cancel the REQ 22 as not being capable of completion. A last try attempt may be specified, however, through a "~last try" parameter entered through a REC 28 command and, if this parameter has been set to TRUE, Queue Manager 12 will make one last attempt to complete the REQ 22. The REQ 22 will normally be deleted from Queue 16 when the "last try" attempt has been executed.

As will be discussed further, the operations of Queue Manager 12 in attempting to execute the REQs 22 will result in certain error codes being returned which may, in turn, effect subsequent attempts to execute REQs 22. For example, if a REQ 22 has specified that a "last try" should be made, and an error code "XREQ" is returned [having the meaning that the task attempt failed, but the REQ 22 should be retained in Queue 16 and rescheduled later even though the normal number or retries has been exhausted] the REQ 22 may be retained and retried at a later time. If the user so desires, this process may be continued indefinitely.

In further example, if an attempt fails and an error code returns that there has been a "communications error" with respect to that destination node, Queue Manager 12 will schedule no other REQs 22 to that destination for a "retry_1_time" period. In a like manner, if a system operator is aware that REQs 22 directed to a particular destination cannot succeed, the operator may SUSPEND that destination and REQs 22 to that destination will not be scheduled until the operator has directed a RESUME for that destination.

In a final example, if a REQ 22 fails to be completed and an error message is returned that a "resource is not available" to accomplish the request, Queue Manager 12 will respond by temporarily reducing the value of "request_limit", that is, the parameter specifying the maximum number of requests that may be active in Queue 16 at a given time. Queue Manager 12 will reduce "request_limit" by one each time such an error occurs, but will never reduce "request_limit" to zero. If no such failures occur for a "retry_1_time" period, then Queue Manager 12 will increase "request_limit" by one for each such error free "retry_1_time" period until "request_limit" reaches its original value.

B.2 Control Commands

Now considering the commands which may appear in the RECs 28 of a User-In 26, as described these commands may be used both to control or direct certain Queue Manager 12 operations and may set parameter or limits applicable to those operations.

As described, each such command occupies a single Record 28 and is generally comprised of a keyword and, in many instances, a parameter field, with the keyword and parameter fields in the following discussions of the commands being delineated by []. The present library of commands include:

Request Limit: [RL][value]

The RL command sets the limit on the number of request that may be active in Queue 16 at any given time, wherein the [value] field sets the request limit, usually a maximum of 10 requests with a default value of 3 requests.

Destination Request Limit: [DRL][value]

The DRL command is used to control the number of simultaneous requests that may be active at any given time for a given destination, wherein [value] sets the maximum number of active requests. This command is active in order to allow Queue Manager take advantage of an XCOMM type error, wherein an XCOMM error states that a task, or request, failed for a reason associated with the communication path to the destination; the task may be rescheduled but no tasks should be scheduled to this destination until the communication path has recovered. A DRL command for a particular destination must be provided if Queue Manager 12 is to apply the SUSPEND and RESUME operations, previously described, for that destination.

Request Intervals: [RI][value-1][value-2]

The RI command is used to set the "retry_1_time" and "retry_2_time" intervals, as previously discussed, [value-1] setting the "retry_1_time" interval and [value-2] setting the "retry_2_time" interval; the default values for value-1 and value-2 are usually, respectively, 3 minutes and 60 minutes.

Retry Limit: [RTL][value]

The RTL command is used to set "retry_limit" to [value] and the default value of [value] is usually 10 retries.

Run: [RUN]

The RUN command starts the execution, or operation, of Queue Handler 18.

Stop: [STOP]

The STOP command shuts down the queue handler. Requests that are currently being executed are allowed to finish but no new requests may be started; when the presently executing requests have finished, the queue handler will return to being controller by its command line processor, that is, and a discussed further in the detailed description of Queue Manager 12, the queue handler subroutines that receive and respond to command lines.

Suspend: [SUSPEND][destination-name]

The SUSPEND command instructs that no further requests for the destination specified in [destination-name] will be scheduled for execution until a RESUME command is executed; the particular destination identified in the parameter field [destination-name] must have been named in a Destination Limit Request command.

Resume: [RESUME][destination-name]

The RESUME command instructs that requests for the destination specified in the [destination-name] field will be executed and is used to cancel the effect of a previous SUSPEND command or to cancel the effect of a communication error.

List Queue: [LISTQ]

The LISTQ command lists all the entries, or requests, currently in Queue 16, with all relevant information about the requestors, number of retries, and so forth.

Delete: [DELETE][request-id]

The DELETE command deletes the REQ 22 identified by the [request-id] field from Queue 16 and, if the request is presently being executed, aborts the execution of the request.

Make Request: [REQUEST][argument—list]

The REQUEST command builds a request according to the argument list specified in [argument—list] and places the request in Queue 16 as a REQ 22. The argument list consists of a string of keywords followed by values. Permissible keywords and values include:

[USER][user—name]: the value "user—name" will be put in the request as the name of the user responsible for the request.

[NODE][node—name]: specifies the name of the Node 24 to which the request is sent.

[CYCLIC][interval]: if this argument is present the request will be cyclic, that is, it will remain in the request queue and will be executed periodically at intervals specified by the interval value.

[ID][request—id]: assigns an identification (ID) to the request that is, for example, the ID that may be used by the DELETE command. If a request with the given ID already exists, the new request will be ignored, which allows a start-up procedure to specify all desired cyclic requests with concern as to whether the request already exists in the queue from a previous run of the queue handler.

[DATA][data]: the character string in "data" is put into the request as the data of the command, that is, the "message" or information to be sent by the request. This argument is required for a request and is always the last argument in the command. Note that a REQUEST command may not appear after a RUN command has been executed.

Execute Command Line: [E][command line]

The E command causes the character string in [command line] to be passed to Queue Manager 12s command processor, described in the following. A command line may be entered at any time by an E command, and will be executed immediately.

Use Delivery Criteria File: [DCF]

The DCF command causes Queue Manager 12 to be aware of and apply any constraints on message delivery that are defined in a Delivery Criteria File when scheduling a request for execution. As will be described in a following discussion, A DCF may be used to inform Queue Manager 12 of any constraints or characteristics of a destination which may effect the execution of requests directed to that destination.

B.3 The Programmatic Interface

As was described, certain of Queue Manager 12's control subroutines, such as those for putting a request, that is, a REQ 22, in Queue 16 or deleting a REQ 22 from Queue 16, may be linked with and invoked from any program. This interface into Queue Manager 12 is referred to as the "programmatic interface" and allows such programs, such as a word processing program or an electronic mail program, to initiate electronic mail messages.

The user program accessible subroutines include:

Put Request In Queue

Format short enter—queue—request (destin, priority, data—field, request—id);

Arguments

| char destin[13]; | /Destination/ |
|---|---|
| short priority; | /Priority, from 1 to 15/ |
| char data—field[150]; | /Data String/ |
| char request—id[6]; | /Pointer to location to return ID/. |

Description

The queue request function will exchange messages with the tasks of the queue handler to cause a REQ 22 to be placed in Queue 16; the queue handler will acknowledge the function when the request has been successfully placed in the queue.

The parameters passed go the queue handler by this function have the following meanings:

destin—This parameter is a character string stating the name of the destination of the request. This parameter is used not only to identify the destination, but by the queue handler in managing an controlling the requests, for example, the number of outstanding requests to a given destination may be limited, as described. This parameter is also passed to the Bound Unit (BU), described further below.

priority—This parameter states the relative priority of the request, from 1, the highest, to the lowest.

data—This parameter is a character string divided into two parts. The first part is a pathname to a Bound Unit (BU), which is an executable program external to the queue manager which is to be executed to carry out the processing of the request, that is, the transport or transmission of the message of the request to the specified destination. There are no restrictions imposed by the queue manager on, types of BUs, what functions are performed by the BUs, or how BUs perform those functions. The pathname may either be absolute or relative to the home directory of the queue manager, but the BUs are expected by the queue manager to reside in the home directory of the queue manager task group. The second part of the character string contains information which is passed to the named BU, as will be described in a following discussion of BUs.

request id—This parameter identifies the storage location of the unique ID assigned to the request by the queue manager.

Finally, this subroutine will return to the requestor a code indicating the completion of a successful attempt to place the request in Queue 16, if the attempt was successful, and an error code indicating a reason for an error if the attempt was unsuccessful.

The user program accessible subroutines further include:

DELETE REQUEST

Format short delete—request (request—id);

Arguments char request—id[6]; /The unique value assigned to the request/.

Description

This subroutine will cause the request identified in the argument field to be deleted from Queue 16 and will return either a success code if the deletion was successful or an error code if the deletion failed.

C. Detailed Description of Queue handler 18 (FIG. 2)

Figure 2:
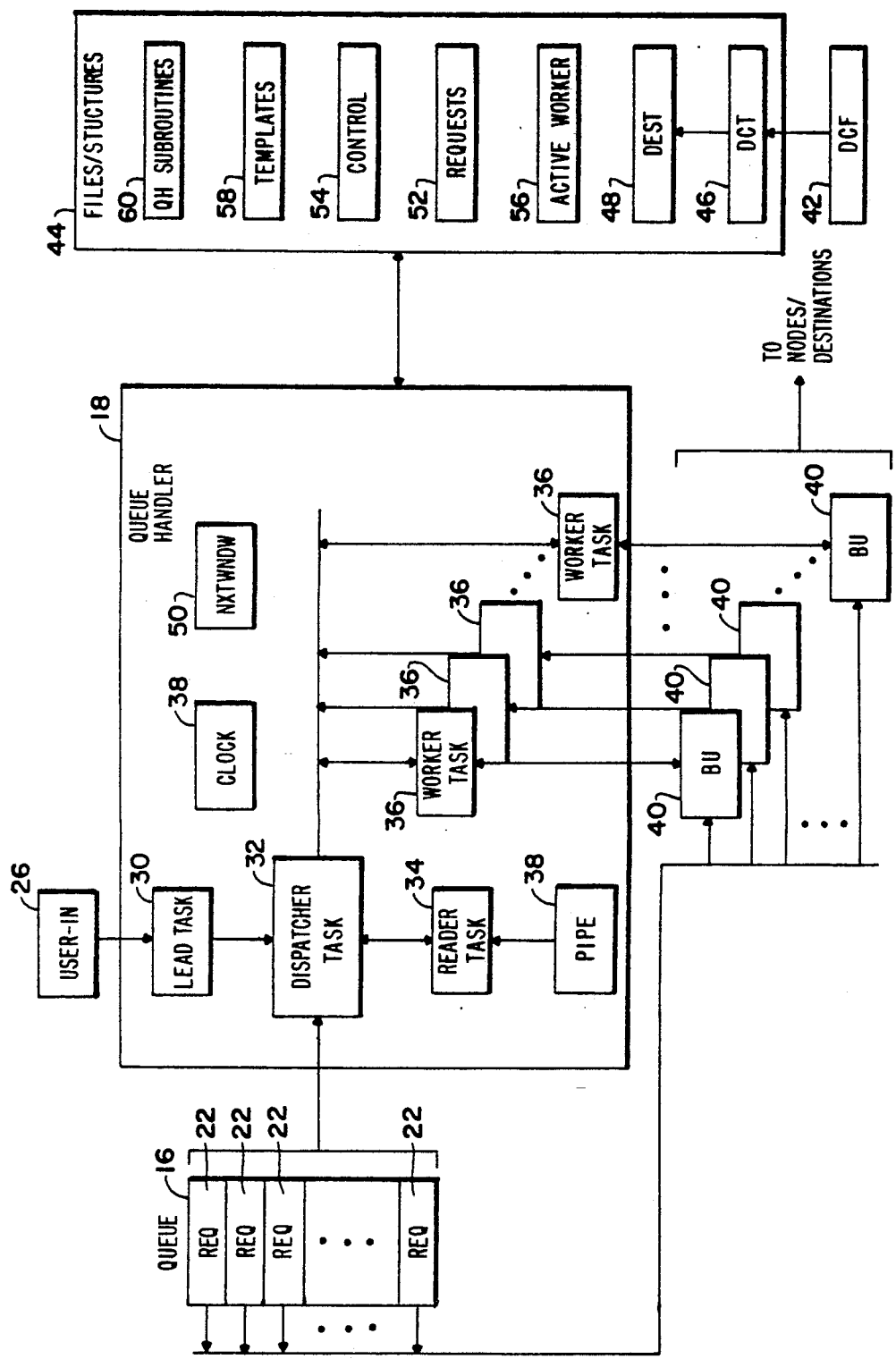
FIG. 2 is a detailed diagrammatic representation of a queue handler of the queue manager of the present invention.

Referring to FIG. 2, therein is shown a more detailed diagrammatic representation of Queue Handler 18. As described, Queue Handler 18 is embodied as a single task group comprised of multiple "tasks" which work together asynchronously to schedule and execute the requests in Queue 16. These tasks share, and communicate through, data variables held in data structures and through a "pipe" file and are created and synchronize their operations according to standard "C" programming process management facilities.

For example, a given task may be created by a call to "fork", which creates two processes, one the "parent" and one the "child", and each executing the same code. Each child process is a copy of the parent, including a copy of the parent's stack and data. The copies are separate, however, so that changes made in one copy's data is not visible to the other. The processes do share data space in common, however, in the group memory space, which contains the task group, that is, Queue Manager 12, data structures described below.

The following will first describe the overall structure and operation of Queue Handler 18. Certain external programs and data inputs to Queue Handler 18 will then be described, such as Bound Units and the Destination Constraint Files used to inform Queue Handler 18 of the relevant characteristics of the destinations. The following will then describe the data structures used by Queue Handler 18, and certain of the subroutines used by Queue Handler 18 to perform its functions.

C.1 Queue Handler 18 (FIG. 2)

As shown in FIG. 2, Queue Handler 18 is invoked by a command line and contains a Lead Task 30 whose primary function is to read the RECs 28, or command lines, of User-Ins 26, interpreting the command lines and setting up a structure of subordinate tasks and the control variables used by the tasks in executing the requests.

For example, Lead Task 30 will, upon reading a START command from a User-In 26, create the next subordinate task, Dispatcher Task 32, which in turn, as described below, creates the next subordinate tasks, and will then return to reading User-In 26 for additional commands. Upon reading a STOP command, Lead Task 30 will initiate a controlled shut-down of Queue Manager 12.

The function of Dispatcher Task 32 is to process the REQs 22 of Queue 16 and respond to events that occur during execution of the requests. In particular, Dispatcher Task 32 creates and starts Reader Task 34, described below, and scan Queue 16 for REQs 22 and Create Worker Tasks 36, also described below, which execute the REQs 22 and carry out other functions of Queue Manager 12. Dispatcher Task 32 also waits for its child tasks, such as Worker Tasks 36, to terminate and takes appropriate action when such a child task terminates. Dispatcher Task 32 also maintains a Clock 38 representing current time and, when no Worker Tasks 36 are active, "sets and alarm". If no other event occurs to initiate action by Dispatcher Task 32, such as the entry of a command line from a User-In 26, the "alarm clock" will "go off" and cause Dispatcher Task 32 to scan Queue 16 for waiting requests.

The function of Reader Task 34 is to receive requests for services from other task groups, and from tasks within the present Queue Handler 18 task group, and to signal the tasks of the group as necessary to respond appropriately to the requests. A Pipe File (PIPE) 38 is used, as is well understood to those of ordinary skill in the art, for such inter-process, that is, inter-task communication. PIPE 38 is used, for example, to read User-In 26s to Dispatcher Task 32, for a Worker Task 36 to return the results of an execution of a request to Dispatcher Task 32, and for the entry and deletion of requests by users as described with reference to the user callable subroutines.

Returning to Worker Tasks 36, Worker Tasks 36 are created by Dispatcher Task 32 to process specific requests, which are passed to them by Dispatcher Task 32 together with a description of the request to be run. Each Worker Task 36 will load the Bound Unit (BU) 40 specified by the request and start executing of the request. When the process is completed, it is terminated and passes back to the Worker Task 36 a status value indicating whether the request succeeded or failed. The Worker Task 36 may then terminate, with Dispatcher Task 32 taking the appropriate action.

There will be a Worker Task 36 created by Dispatcher Task 32 for each REQ 22 in Queue 16 which is to be executed, as indicated in FIG. 2, and each Worker Task 36 will invoke the appropriate BU 40 which has been specified in the corresponding REQ 22 for executing the request.

C.2 Bound Units 40

As was described, each BU 40 is an executable program which is capable of performing the functions necessary for execution of a request, that is, the transport or transmission of the request's message to the specified destination. BU 40s will thereby most usually be comprised of various communications and electronic mail programs and, apart from the requirements imposed on the BU 40s by their intended functions, the following describes certain BU 40 requirements for operation with Queue Manager 12.

Each REQ 22 entered in Queue 16 will specify the name of a BU 40 which is to be executed to carry out processing of the request. The BU 40 will be loaded and executed as if it had been linked to the Worker Task 36 as a "C" language main program. This requires that the BU 40 be entered with two arguments, according to standard "C" conventions.

These arguments are an "argc" and an "argv[]", wherein argc states the number of entries in argv, while the entries in argv are each pointers to characters strings containing information required for execution of the BU 40. The elements of argv are:

argv[0]: a pointer to the BU 40 name;

argv[1]: the ID of the requestor;

argv[2]: the unique ID of the REQ 22;

argv[3]: the Destination;

argv[4]: the data string (message) provided by the requestor;

argv[5]: a "last time" indicator—if Queue Manager 12 has attempted this request the maximum number of times, this argument will be an "L", otherwise it will be a null value; and, argv[6]: an auxiliary BU name used in electronic mail requests and containing a BU 40 name identified in a Destination Constraint File.

Depending upon the results of the attempt by the BU 40 to execute the request, the BU 40 invoked by a Worker Task 36 will end by executing a standard "C" exit call. The parameter generated by the BU 40 will be passed back to Dispatcher Task 32 by means of a record written into Pipe 38 by the BU 40 and read from Pipe 38 to Dispatcher by Reader 34 and will indicate the results of the attempt. In the present implementation of Queue Manager 12, these return parameters and their effects on Queue Manager 12 operations, which have been previously discussed in Section B.1 Constraints, include the values:

0—The request was completed satisfactorily;

1—The request failed to complete; Queue Handler 18 will interpret this error message to mean that the request should not be rescheduled for a later attempt;

XERR—The request failed to complete, the reason for the failure is transitory; Queue Handler 18 will interpret this error message to mean that the request should be rescheduled for a later attempt;

XCOMM—The request failed for a reason associated with the communications path to the destination; Queue handler 18 will interpret this error message to mean that the request can be rescheduled for a later attempt, but that but no requests should be scheduled for this destination until the communications path has recovered;

XRES—The request failed for a reason associated with the availability of resources; Queue Handler 18 will interpret this error message to mean that the request can be rescheduled but that the number of tasks being handled concurrently should be temporarily reduced; and, XREQ—The request failed; Queue Handler 18 will interpret this error message to mean that, even though the normal number of retries has been exhausted, the request should be retained in Queue 16 and rescheduled for a later attempt.

The data structures and subroutines through which Queue Handler 18 implements these modifications to its operations will be discussed in following sections of this description.

C.3 Destinations and Delivery Criteria

C.3.1 Destinations

It is apparent from the above discussions that the characteristics of the intended destinations of the requests, that is, the Nodes 24 and the communications paths to the destinations, may have a significant effect on the operations of Queue Manager 12. It has also been described that Queue Manager 12 has the capability to adapt to the characteristics and constraints of the destinations and communications paths, whether permanent or transitory. For example, Queue Manager 12 may reschedule certain attempts to execute requests if the requests may, for temporary reasons, not be executed due to a temporary condition of the destination or communications path. Queue Manager 12 may also temporarily suspend the execution of requests to certain destinations, or may adjust the number of request attempts at any given time to be within the capacity of either the destination or communications paths or other resources of the system.

The following will now discuss the effects of certain characteristics or constraints imposed by the destinations, the communications paths and the system resources, and the responses of Queue Manager 12.

In a first example, a number of queued requests may form a group in that all of the requests of the group are intended for the same destination. If the communication link to this destination, or the resources of the destination for handling requests, are limited in some manner, the total number of requests addressed to that destination may exceed the capacity of the communication link or the destination; the requests may then compete among themselves for the limited resources and system performance will be degraded.

Queue Manager 12 identifies such groups of requests through the use of "destination names", previously described with reference to the structures of the REQs 22. That is, Queue Manager 12 identifies those requests having a common destination name, and recognizes and handles such requests as groups. For these purposes, Queue Manager 12, and the system operation, have certain tools and functions which may be used to "tune" the performance of the system, in particular, Queue Manager 12. Certain of these tools and functions have been discussed in part in Section B.1 Constraints and B.2 Control Commands, and others will be discussed in following sections of this description.

For example, the number of requests in execution for a particular destination may be limited to be less than a prescribed number.

In another example, the failure of one request of a group to be executed due to the failure, characteristics or constraints of the destination or communication path to the destination, will mean that other requests to the same destination will probably also fail. As was described, Queue Manager 12 provides the facility, through the error message returns of BUs 40, described above, to report such a condition to Queue Handler 18. Queue Handler 18 includes the functions necessary to "throttle" requests to this destination. For example, Queue Handler 18 may reschedule all requests to the destination for later attempts, or may reduce the number of attempts to that destination at any given time. None of the members of the group of requests to that destination will be rescheduled until a specified item has passed. One request will then be attempted and, if it succeeds, all members of that group of requests become eligible for execution. If that trial attempt fails, the destination will remain restricted and another attempt to execute a single request made again at a later, specified time.

The system operator may also SUSPEND a given destination and none of the requests to that destination will be scheduled for execution. The operator may RESUME that destination at a later time and scheduling of requests to that destination will be resumed.

In yet another example, the scheduling of requests by Queue Handler 18 may be constrained by restrictions specified in Delivery Criteria Files (DCFs), which are described further below, corresponding to certain or all of the possible destinations.

C.3.2 Delivery Criteria, Files and Algorithms

Queue Handler 18 may be provided with one or more files, referred to in FIG. 2 as Delivery Criteria Files (DCF 42) which specify limitations on the transmission of messages, that is, the execution of requests, between nodes of the system, that is, from a User 20 to a Node 24.

As has been described, each request has a relative priority stated in its corresponding REQ 22 data structure and a DCF 42 will specify, for each level or priority, a set of "windows" in time during each 24 hour day during which requests having the corresponding priority may be executed to the given destination. A request to a given destination will be attempted only if the window for that destination corresponding priority of the request is open.

In addition, each "window" has associated with it an "economic quantity" which specifies, for that destination, window and priority, the minimum number of requests that should be executed for optimum use of the destination and communications link resources. Queue Handler 18 will hold all requests for a given destination and of a given priority until the number of requests awaiting execution is equal to or greater than the "economic quantity"; when the number of pending requests reaches the "economic quantity", all of the requests will be executed.

Each DCF 42 has a header block, followed by up to 9 window descriptions. The header block has the structure:

| WORDS | CONTENT |
|---|---|
| 0-1 | Node (destination) Name; |
| 2-3 | Not Used; |
| 4-7 | Name of BU 40 providing message transport; |
| 8-10 | Not Applicable; |
| 11 | Number of Priority 1 Windows; |
| 12 | Offset to first Priority 1 Window Descriptor; |
| 13 | Number of Priority 2 Windows; |
| 14 | Offset to first Priority 2 Window Descriptor |
| 15 | Number of Priority 3 Windows; and |
| 16 | Offset to first Priority 3 Window Descriptor. |

While each window descriptor has the structure:

| WORDS | CONTENT |
|---|---|
| 0 | Economic Quantity; |
| 1-2 | Start time of window (hour, minute); and, |
| 3-4 | Ending time of window (hour, minute). |

As was described previously, Queue manager maintains a set of files, data structures and subroutines which are used by the tasks of Queue Manager 12 to carry out all queue related operations. These files, data structures and subroutines are represented in FIG. 2 as FILES/STRUCTURES 44 and include the data structures containing the information pertaining to characteristics and constraints applying to destinations.

Queue Handler 18 will use a DCF 42 if a DCF command was received from a REC 28 of a User-In 26 and executed during Queue manager 12 start up. If such a DCF command was executed, and a DCF 42 provided, Dispatcher Task 32 will store the information from the DCF 42 in a Destination Criteria Table (DCT) 46 in Queue Manager 12's FILES/STRUCTURES 44 and, from the information in DCT 46 will build and maintain a Destination Table (DEST) 48.

DCT 46 is built as a linked list of entries wherein each entry contains the description of the delivery criteria, that is, the criteria pertaining to the execution of requests, for one Node 24. Each entry contains a pointer to the next entry, with the last entry containing a null pointer, and has the structure, in standard "C" notation:

```
typedef struct DCF_table {
    struct DCF_table *next_ptr;        /*pointer next entry*/
    char node [5];                     /*destination name*/
    char BU_name[9];                   /*BU 40 name*/
    short p1_count;                    /* number priority 1_
                                          windows*/
    short p2_count;                    /* number priority 2
                                          windows*/
    short p3_count;                    /* number priority 3
                                          windows*/
    DCF_WINDOW [p1_count + p2_count +  /*total
    p3_count];
                                          windows*/
} DCF_TABLE;
typedef struct DCF_window {
    short econ_q;                      /*Economic quantity*/
    short w_open;                      /*Window open time*/
    short w_close;                     /*Window close time*/
} DCF_WINDOW
```

As was described with reference to a DCF 42, the maximum number of windows that may be defined for a single node (destination) is 9, three each for each of three priorities, and the DCT 46 entry for each destination will contain information pertaining only to the windows actually specified.

The Destination Table (DEST) 48 contains destination related information used directly by Dispatcher Task 32 in managing the execution of requests to the various destinations. DEST 48 contains an entry for each currently active Node 24, that is, destination, in the system, with each entry having the structure, again in standard "C" notation:

```
typedef struct dest_entry {
    DEST_ENTRY                /*pointer to next entry*/
    *next_ptr;
    char dest_name[14];       /*destination name*/
    short dest_limit;         /*maximum number of
                                 simultaneous active
                                 requests for this
                                 destination; set by a DCL
                                 command*/
    short dest_count;         /*current number of active
                                 requests*/
    short dest_control;       /*see comments below*/
    long dest_time_blocked;   /*destination blocked
                                 [SUSPENDED] until (time)*/
    short quantity_[3];       /*quantity_p[i] contains
                                 the number of requests
                                 currently queued at
                                 priority i + 1*/
    short threshold_p[3];     /*contains a threshold
                                 level, by priority,
                                 determined from the
                                 last scan of DCF 42*/
    short *DCF_entry;         /*DCF 42 entry associated
                                 with destination*/
} DEST_ENTRY;
```

Comments "dest_control" contains switches that control the scheduling of requests, in particular:
bit 0: TRUE if the destination has been blocked [SUSPENDED] by the system operator;

bit 1: TRUE if the destination is blocked because a request reported a communications failure; it is cleared when a request succeeds;

The remaining switches are used if scheduling is being controlled by a DCF 42:

bits 9-11: Priority switches; there is one switch for each priority level and a particular switch is TRUE if communications with the destination is permitted at the current time by the DCF 42;

bits 13-15: "Triggered" switches; TRUE if the request count requirements of the DCF 42 have been met for the corresponding priority level; a switch will be set when a new request causes the current count in "quantity_p" to exceed the threshold count in "threshold_p".

DCT 46 thereby contains the destination related information extracted from DCF 42 for all destinations in the system, while DEST 48 contains information for all currently active destinations in the system. Dispatcher Task 32 uses DCT 46 and DEST 48 to determine the eligibility of requests for execution.

Dispatcher Task 32 will scan the entries of DCT 46 to determine which entries contain windows which are currently open and, if one or more contains open windows, will mark the corresponding DEST 48 entries as active, noting the economic quantity for each priority for each window in the corresponding DEST 48 "threshold_p" entry.

As Dispatcher Task 32 scans DCT 46, it notes and stores in memory, for example, in Next Window (NXTWNDW) 50, the time at which any window specified in any entry of DCT 46 opens or closes. When the current time in CLOCK 38 and the next window time stored in NXTWNDW 50 correspond, Dispatcher Task 32 scans DCT 46 again, and updates DEST 48 to show the current status of all active destinations therein with respect to windows.

When Dispatcher Task 32 receives a request, Dispatcher Task 32 will determine the eligibility of the request for execution by noting the destination named in the request and scanning DEST 48 for that destination. If the current count of requests for that destination, of the same priority level as the request presently being evaluated, exceeds or equals the economic quantity for the destination and priority level, the corresponding triggered switch [of bits 13-15] in DEST 48 will be set to TRUE, thereby indicating that that destination is for delivery of requests of that priority level.

If the triggered switch for the destination and priority level identified in the request are TRUE, either because the trigger was already TRUE or because it has just been set TRUE because of the present request, that request, together with any other requests for that destination and priority level, may be scheduled for execution.

Once set to TRUE, the triggered switch for a given destination and priority will remain TRUE until the count of pending requests for that destination and priority drop to zero, that is, they have been executed, or the window is closed according to the information in DCF 42, or the destination is SUSPENDed for some reason.

Any time that Dispatcher Task 32 receives a message through Pipe 38 that DCF 42 has changed, Dispatcher Task 32 will delete the current DCT 46 and DEST 48, and rebuild the DCT 46 and DEST 48 from the new DCF 42.

The use of DCT 46 and DEST 48 allow Dispatcher Task 32 a significant degree of control and flexibility scheduling the execution of requests. The provision of different priorities for requests, with one or more windows for each priority for each destination, and the ability to specify different economic quantities for each window allow the scheduling of requests to be tailored very flexibly for each different system, that is, combination of users, user needs, resources, communications links, destinations and message traffic patterns.

For example, if the quantity of queued requests equals or exceeds the economic quantity for a given priority and destination and a corresponding window is open, transfer is started, referred to as "starting a batch", and continues until all requests have been executed.

If a window closes during a transfer, the transfer in progress, of the requested queued at the time of "start of batch" will be allowed to complete, but no new requests will be processed.

If a batch is started for and priority, and queued requests with higher priority will also be executed. For example, if a batch is started for priority 3, any waiting requests for priority 1 or priority 2 will also be executed, with the higher level priority requests being executed first. New requests will also be executed so long as the window remains open.

Queued requests of a higher priority level will be counted towards the economic quantity for requests of lower priority levels. For example, if the economic quantity for each priority level is 10 and 3 requests are queued for each priority level, then a single new request of any priority level will, under the operational rules described just above, cause all requests to be executed.

Finally, if a change in a window changes the economic quantity of the window, a batch in progress will be allowed to completely finish.

C.4 FILES/STRUCTURES 44

As was described FILES/STRUCTURES 44 contains a set of files, data structures and subroutines which are used by the tasks of Queue Manager 12 to carry out all queue related operations. In addition to those already discussed, that is, DCT 46 and DEST 48, these files include a Request File (REQUEST) 52, a Control Data File (CONTROL) 54, an Active Worker File (ACTIVE WORKER) 56 and a set of Templates 58, which store the formats for the other file structures of FILES/STRUCTURES 44.

It should be noted that many of these files and data structures, and Queue 16, are maintained on a disk rather than in memory to provide additional security against data loss in the event of a system failure.

C.4.1 REQUEST 52

REQUEST 52 is an indexed file containing one record for each pending request in Queue 16 and is constructed, maintained and accessed by Dispatcher Task 32 and other tasks of Queue Handler 18 for all basic information about the pending requests. Each record in REQUEST 52 has the structure, in standard "C" notation:

```
struct r_file_rec {
    long req_key;            /*unique key identifying
                               the request*/
    short req_type;          /*request type - Normal or
                               Cyclic*/
    char user_name[33];      /*ID of requestor*/
    char destin[13];         /*name of destination*/
    char resource[13];       /*Not Used*/
    short retry_count;       /*number of times request
                               has been retried*/
    long last_retry_time;    /*time request was last
```

```
            tried*/
long retry_interval         /*time between Cyclic
                              retries*/
char data_f[150];           /*name of BU 40 to execute
                              request and data string
                              to be passed to BU 40*/
```

C.4.2 CONTROL 54

CONTROL 54 is constructed and maintained by Queue Manager 12 to contain data and variables used in communication among the tasks of Queue Manager 12. This information may be accessed or modified by any tasks and has the structure, again in standard "C" notation:

```
struct control_data_record {
    /*Limits and Restrictions*/
    short initial_request_limit;    /*Limit or worker
                                      tasks*/
    short retry_limit;
    ushort retry_1_time;            /*Times between
                                      retries*/
    ushort retry_2_time;
    DEST_ENTRY *dest_table;         /*Table of restricted
                                      destinations*/
    /*Control Variables*/
    short req_limit;                /*Current limit on
                                      tasks*/
    short active_tasks;             /*Current count of
                                      worker tasks*/
    long XRES_time;                 /*Time since resource
                                      failure*/
    short dispatcher_process;       /*Process ID of
                                      dispatcher task*/
    short reader_process;
    shortr req_file;                /* lfn of queue*/
    short pipe_file;                /*lfn of pipe*/
    short shutdown;                 /*FALSE until system
                                      shutdown*/
    short DCF_active;               /*TRUE if DCF is
                                      active*/
    ACTIVE_WORKER task_table [WORKER_LIMIT]
                                    /*Table of current worker
                                      tasks*/
    /*Task to Task Data*/
    short new_read;
    short result;                   /*Was request queued
                                      OK?*/
    long request_id;                /*Unique ID of
                                      request*/
    PIPE_REC pipe_rec;              /*Record read by
                                      reader*/
    DCF_TABLE *DCF_ptr;             /*Pointer to DCF
                                      Table*/
}
```

C.4.3 ACTIVE WORKER 56

Active Worker 56 is constructed and maintained by Dispatcher Task 32 to track all presently active Worker Tasks 36. There is one entry in ACTIVE WORKER 56 for each active Worker Task 36 with each entry having the structure, again in standard "C" notation:

```
typedef struct worker_entry {
    long request_id;
    short req_type;
    short worker_process_id;
    char user_name[13];
    DEST_ENTRY *worker_destination;
    short last_time_sw
} ACTIVE WORKER;
```

C.5 Queue Handler 60 Subroutines

As was described, FILES/STRUCTURES 44 also contains the Queue Handler Subroutines (QH Subroutines) 60 used by Queue Manager 12 in performing the above described operation. QH Subroutines 60 in turn fall into two groups, the first group being the subroutines used by Queue Manager 12 to manipulate Queue 16 and the second being subroutines used by Queue Manager 12 and, in particular, Lead Task 30, in reading command lines, that is, RECs 28 of the User-In 26s. The following descriptions of the subroutines and their operation will serve to further describe the operation of Queue Manager 12 in yet further detail.

C.5.1 Queue Manipulation Subroutines

The subroutines used by Queue Manager 12 to manipulate Queue 16, and their functions, some of which are defined in terms of and use other subroutines, include:

Q01build_new_entry

Build a new request description from the information in the global variable "new_request" and write it into REQUESTS 52, "r_file". Then flush r_file and Return.

Q02flush

Force logical changes to the files to be actually written to the disk. This is done by executing a data management "cleanpoint" monitor call.

Q03queue_control

This subroutine schedules tasks as appropriate. In detail, the procedure is:
Execute scan queue;
Wait;
When Wait is broken, examine the reason for the break: whether it was caused by the termination of a child task or the receipt of a signal, for example, that Reader Task 34 has received a message from another task or Lead Task 30 has received a command line;
If the wait was broken because of the termination of a child task, that is, a Worker Task 36, locate the child task in ACTIVE WORKER 56 and call Q09terminate_worker;
If the reader task has read a new request, indicated by the common switch "new-read" being TRUE, set the switch to FALSE and call Q01build_new_entry; send a signal to Reader Task 34;
If Reader Task 34 has read a "Scan DCF" request and the DCF 42 is active, call Q10DCF_scan;
If the shutdown switch is not on, check to see if any worker task is still active; if all worker tasks have terminated, break out of this loop;
If the number of active worker tasks is zero, set the alarm clock;
On breaking out of the above loop, proceed to an orderly shutdown by sending a message to Reader Task 34 by setting the shutdown switch, which was already done, and breaking Reader Task 34's waiting state by writing to a dummy record through PIPE 38; wait for Reader Task 34 to terminate, and Exit.

Q04scan_queue

This subroutine will scan the request file, QUEUE 16, examining each request, that is, REQ 22, to see if it is eligible for execution. If any REQ 22 is eligible, it will be scheduled for execution through Q05schedule.
In detail, and for each REQ 22:
If the number of active tasks is greater than or equal to the maximum number of active tasks, no new tasks may be scheduled; Return;

Examine each record in REQUESTS 52; a request may not be scheduled if it meets any of the following conditions:

It is already in execution;

Another request for this user is already in execution;

The maximum number of requests for the destination are already in execution, or the destination is SUSPENDed;

The request was previously scheduled and failed, and the time between retries has not yet elapsed;

If the request is controlled by a DCF, the destination must be found in DCT 46; the current count for the request's priority is incremented and compared to the current economic quantity; if the current count is equal to or greater than the economic quantity, and the corresponding window is open, the "triggered switch" for this and higher priority requests is set to TRUE; in any case, the "triggered switch" is examined and if it is not TRUE the request will not be scheduled;

If the number of active tasks reaches the maximum, the subroutine Returns at once; if the end of the REQUESTS 52 file is reached, DEST 48 will be updated; if the current count for a priority is zero, the "triggered switch" for that priority will be set FALSE.

Q05schedule (buff)

"buff" contains a description of a request to be executed;

Search ACTIVE WORKER 56 for an empty slot and copy the request description into it [see the description of ACTIVE WORKER 56 entries];

Build a description of the new task parameters and execute "run1" to create a new process (task) to run it;

The new process will execute the specified BU 40;

The original process (task) will examine status to make sure the child task was created properly and, if it was not, the entry describing the failure must be deleted from ACTIVE WORKER 56 by a call to Q09terminate_task.

Q06show_queue

Scan the file of pending requests and print out a line for each pending request;

REQUESTS 52 is opened in "read-only" mode for this subroutine, and is closed before the subroutine exits;

If any errors are encountered, the errors are returned to the caller.

Q07start_read

This subroutine is called to initially start Reader Task 34. The parent task will Return after starting Reader Task 34 and Reader Task 34 will loop forever in this subroutine, reading the input pipe.

In detail:

Fork; the parent task saves the ID of the child [Reader Task 34] as reader_process and Returns; the child [Reader Task 34] will loop forever reading the pipe;

Specifically:

Read the pipe for record type 0 until data is received; if the shutdown switch in on, execute Exit;

If the record read is "Obtain Channel ID", write a "Channel Assignment" record; increment the channel counter, recycling it to 2 if it reaches 2048;

If the record is "Request", "Delete" or "Scan DCF", move the data into "reader_record" and send a signal to Dispatcher Task 32; this signal indicates that Dispatcher Task 32 has put the request in it queue; Reader Task 34 will write a "Request Acknowledgment" record into the pipe;

In both cases, go back for another record to be received through the pipe.

Q08dlt_task

Locate the specified request in Queue 16 and delete it;

If the request is executing, abort it.

Q09terminate_worker

Scan ACTIVE WORKER 56 for this task;

If the request succeeded, or failed in a way to prevent restart of the request, delete record from REQUESTS 52;

If the request failed but is able to be restarted, increment the retry count and rewrite the record in REQUESTS 52;

If the request failed because of resource constrains, such as an over burdened communications link, decrease the maximum number of active tasks by one, to a minimum of one;

In either case, purge, delete the entry from ACTIVE WORKER 56, and decrement the number of active tasks.

Q10DCF_scan

Clear all priority switches in the existing DCT 46, do not change "triggered" switches;

If a DCT 46 entry references a destination that is not currently in DEST 48, create an appropriate entry in DEST 48;

For each record in DEST 48, compare the current time [CLOCK 38] to the windows defined in the record;

If the window is open, set the appropriate "enabled" switch TRUE, and set the economic quantity to the value specified in the DCF 42.

Q11DQE

Delete the specified REQ 22 from QUEUE 16;

If the parameter "destination_ptr" is not NULL and the selected DEST 48 entry is controlled by a DCF 42, decrement the count of pending requests for this priority;

If the number of pending requests for this priority reaches zero, set the "triggered" switch for this priority OFF.

Q12increment_count

The parameters define a DEST 48 entry and a priority;

Increment the counter corresponding to the priority;

Set the priority "triggered" switch TRUE if the following conditions are satisfied:

The priority is active; or

The current count for this and higher priorities is greater than or equal to the economic quantity;

If the "triggered" switch for any priority is set TRUE, so are the "triggered" switches for higher priorities.

Q13DCF_read

Open the DCF 42;

Read the DCF 42 sequentially;

For each record of the DCF 42 after the first, allocate a record in DCT 46 and build a DCF record in the space occupied by the old DCT 46, otherwise free any memory space allocated in this attempt;

Return with 0 if no error occurred, or the error code if there has been an error.

Q14DT_search

Search DEST 48 for the specified destination;

If it is found, return a pointer to the entry, otherwise return NULL.

C.5.2 Command Line Processing Subroutines

As has been described, command lines, that is, REC 28, are read from User-In 26s by Lead Task 30, which interprets each command line as it is received and takes the appropriate actions. The present command line processing subroutines, and their functions, include:

C01read_keyword

Read a keyword from the REC 28;

Look up the keyword in a table of keywords;

Return the keyword number assigned to the keyword.

C02read_value

Read a numeric value from a REC 28;

Return the value read;

If the value is not a valid integer, return −1.

C03read_name(parameter)

Read a name [a string of characters terminated by a space, or a quoted string] from a REC 28;

Put the string read into the parameter as a null_terminated string.

C04scan_line

Scan until End Of Line is reached;

This subroutine merely discards the remainder of the current command line following the End Of Line.

The above discussions have described the structure and operation of a queue manager of the present invention in detail through descriptions of its overall structure and tasks, its data and control structures, the operations of the queue manager, and the subroutines used by the queue manager, so that the construction and operation of a communications queue manager of the present invention will be well understood by those of ordinary skill in the art.

D. Summary

To summarize the operation of the queue manager of the present invention, the present queue manager provides a method for controlling the execution of requests for the transport of messages from users to destinations so as to be adaptable to constraints of the destinations and communications links.

The queue manager includes a queue for storing pending requests, a dispatcher task responsive to each request for creating a corresponding worker task to execute the request and for associating the worker task with a corresponding bound unit for transporting the messages to the destination through communications links. In addition to the queue, the tasks comprising the queue manager, and the library of subroutines used by the queue manager to execute its operations, all of which have been described in detail above, the queue manager constructs and maintains a set of data structures used to track and manage the execution of the requests.

As was described, each each request includes, together with other information described below, a message, an identification of a destination, and an indication of the relative priority level of the request. In addition to placing each request in the queue when received, the queue manager also builds and maintains a request table, which is an indexed file containing one record for each pending request in the queue.

Each request table entry includes an indentification of the request, whether the request is normal or cyclic, an identification of the requestor and destination, the number of times the request has been retried, the time between cyclic retries, and the name of the bound unit to execute the request.

In addition, the queue manager is provided with a destination criteria file which contains, for each destination, information relating to constraints on the delivery of messages to the destination. The queue manager uses the information from the destination criteria file to build and store a table containing an entry for each destination, wherein each entry includes an identification of a bound unit serving that destination, and a set of descriptors describing time windows during which the destination may receive messages. Each window corresponds to a priority level and each window descriptor contains parameters identifying the priority level of the window, a time during which the window is open, and an economic quantity. The destination table will be updated or even rebuilt according to changes in the destination constraints.

Thereafter, the queue manager's dispatcher task scans the destination table to determine which windows are currently open and scans the queue to identify pending requests for the currently open windows. The dispatcher task determines whether the number of requests for an open window equals or exceeds the economic quantity for the window, and executes the requests corresponding to each currently open window wherein the number of requests satisfies the economic quantity for the window.

It should be noted that, in the present implementation, the scanning of the destination table by the dispatcher task is controlled, at least in part, by the opening and closing of the windows as indicated in the destination table. That is, each time the dispatcher task scans the destination table, it notes the time that either the next window opens or a present window closes and sets an "alarm" to rescan the destination table when this event occurs so as to determine the next time of a window opening or closing.

Upon detecting an open window, the queue manager will scan the request table for pending requests for that destination and will examine both the priority levels of the requests and the number of pending requests to determine whether the pending requests meet the economic quantity for that window.

In this operation, the queue manager will count queued requests of a higher priority level for a destination towards satisfying the economic quantity o a lower level priority window of that destination.

Upon identifying a group of requests corresponding to a currently open window and satisfying the economic quantity for the window, the dispatcher task will then execute that group of requests as a batch, including all higher level priority requests then pending for the window.

It should be noted that, if the window closes during the execution of a batch of requests for the window, the execution of all requests in the batch will be completed.

Upon each attempt to execute a given request, the bound unit responsible for executing the request will be responsive to the result of the attempt to transport the message of the request and will provide a corresponding result message to the dispatcher task indicating the results of the attempt.

The dispatcher task is in turn responsive to the result message to reschedule execution of a request according to the retry parameters when an attempt to execute the request fails. As was described, the retry parameters stored in the request table for each request include at least a parameter specifying a time interval to elapse before the request is to be retried, and may include a parameter specifying whether the request is to be retried a limited number of times, or is to be retried until successfully executed.

When an attempt to execute a request fails, the dispatcher task responds to a failed attempt, as indicated by the result message, to read the retry parameters for the request from the request table and reschedule the attempt accordingly.

In addition, when the dispatcher task detects a failure to execute a request to a destination, the dispatcher task will suspend execution of all requests to that destination for a specified time, writing the appropriate notation into the destination table that that destination has been suspended.

The dispatcher task will detect when the specified suspension interval for a suspended destination has elapsed by scanning the destination table entries as described above and noting that the windows for the destination will be able to open at the end of the suspension time.

The dispatcher task will then attempt to execute a request to the suspended destination after the elapse of the specified suspension interval. The dispatcher task will resume execution of all other requests to the destination if the attempt to execute a request to the destination succeeds and will continue the suspension of execution of requests to the destination for a further specified suspension interval when the attempt to execute a request to the destination fails.

While the invention has been particularly shown and described with reference to a preferred embodiment of the method thereof, it will be also understood by those of ordinary skill in the art that various changes in form, details and implementation may be made therein without departing from the spirit and scope of the invention as defined by the appended claims.

What is claimed is:

1. A computer system-controlled method of managing concurrent requests for the transmission of messages to a plurality of destinations over a communications network; wherein each of said requests is stored in said system and comprises an identification of the destination to which an associated message is to be sent and a priority level which represents the relative urgency for transmission of the associated message; said method comprising the steps of:

said system maintaining a table in a store thereof, said table having an entry for each one of said destinations, each of said entries comprising, for each possible one of said priority levels, (i) at least one time window, each said time window representing a diurnal interval when a request having said one priority level may be transmitted to said one destination, and (ii) for each one of said time windows, a number representing a minimum number of messages which should be transmitted to said one destination during said one time window for optimum use of the communication link of said network to said one destination;

a first process;

(a) scanning the entries of said table to identify all entries having time windows which include the then-current time;

(b) scanning each of said requests which are then pending to identify all such requests having destinations and priority levels corresponding to the entries identified in step (a);

(c) determining the quantity of said requests identified in step (b) which constitute a group having common destinations and priority levels; and (d) identifying each group of requests for which said quantity determined in step (c) equals or exceeds said number of the corresponding time window; and a second process transmitting the associated messages of each group of requests identified in step (d) to their respective destinations.

2. The method of claim 1, wherein: all associated messages of each of said groups are transmitted as a batch to the respective destination of said group.

3. The method of claim 1, wherein: if during the transmission of the associated messages of one of said groups, the then-current time passes out of the corresponding time window, the transition of all associated messages of said one group will be completed.

4. The method of claim 2, wherein: the associated messages of all pending requests having a higher priority level than the priority level corresponding to a group of requests identified in step (d) but having the same destination as said group are transmitted with the message batch of said group.

5. The method of claim 1, wherein: to a quantity determined in step (c) is added the number of pending requests having the same destination as the corresponding group but having higher priority levels than the requests of said group.

* * * * *